United States Patent
Hung et al.

(10) Patent No.: US 9,027,679 B2
(45) Date of Patent: May 12, 2015

(54) SERIES-PARALLEL COUPLING CONTROL METHOD AND SYSTEM OF HYBRID POWER SYSTEM

(75) Inventors: Yi-Hsuan Hung, Taipei (TW); Chien-Hsun Wu, Banqiao (TW); Bing-Ren Chen, Zhonghe (TW); E-In Wu, Zhonghe (TW)

(73) Assignee: Industrial Technology Research Institute, Hsinchu (TW)

( * ) Notice: Subject to any disclaimer, the term of this patent is extended or adjusted under 35 U.S.C. 154(b) by 1498 days.

(21) Appl. No.: 12/400,929

(22) Filed: Mar. 10, 2009

(65) Prior Publication Data
US 2010/0133027 A1    Jun. 3, 2010

(30) Foreign Application Priority Data
Nov. 28, 2008   (TW) .............................. 97146440 A

(51) Int. Cl.
*B60K 6/442*    (2007.10)
*B60W 10/06*    (2006.01)
*B60W 10/08*    (2006.01)
*B60W 20/00*    (2006.01)

(52) U.S. Cl.
CPC ........... *B60K 6/442* (2013.01); *B60L 2240/421* (2013.01); *B60L 2240/423* (2013.01); *B60L 2240/441* (2013.01); *B60W 10/06* (2013.01); *B60W 10/08* (2013.01); *B60W 20/00* (2013.01); *B60W 2510/0638* (2013.01); *B60W 2510/081* (2013.01); *B60W 2710/0672* (2013.01); *B60W 2710/085* (2013.01); *Y02T 10/6234* (2013.01); *Y02T 10/6286* (2013.01); *Y02T 10/642* (2013.01)

(58) Field of Classification Search
CPC .... B60K 6/44; B60K 6/442; B60L 2240/421; B60L 2240/423; B60L 2240/441; B60W 10/08; B60W 20/00; B60W 2710/0672; B60W 2710/085
USPC ............................... 180/65.21, 65.23, 65.225
See application file for complete search history.

(56) References Cited

U.S. PATENT DOCUMENTS 6,318,486 B2   11/2001   Masaki
6,491,120 B1 *  12/2002   Ogburn ...................... 180/65.25
6,876,098 B1    4/2005   Gray, Jr.
(Continued)

FOREIGN PATENT DOCUMENTS

TW          I297371       6/2008
TW       200827215 A      7/2008

OTHER PUBLICATIONS

Office Action for Application No. 097146440 issued Sep. 6, 2011; TIPO.

*Primary Examiner* — J. Allen Shriver, II
*Assistant Examiner* — Emma K Frick
(74) *Attorney, Agent, or Firm* — Stevens & Showalter, LLP

(57) ABSTRACT

A series-parallel coupling control method and system for a hybrid driver are suitable for a hybrid power vehicle. The hybrid driver is used to produce a driving force to drive a load. The hybrid driver includes a first power generation unit, a second power generation unit, and a main controller. The main controller selectively controls the system to drive the load in a series power coupling mode or a parallel power coupling mode. The main controller switches between the series coupling mode and the parallel coupling mode by using rotation speed compensation or torque/power compensation. Therefore, the driven load will not suffer from sudden thrust or jerk.

15 Claims, 6 Drawing Sheets

(56) References Cited

U.S. PATENT DOCUMENTS

| | | |
|---|---|---|
| 6,998,727 B2 | 2/2006 | Gray, Jr. |
| 8,417,427 B2 * | 4/2013 | Stridsberg ............... 701/51 |
| 2002/0060114 A1 * | 5/2002 | Maruyama ............ 192/3.63 |
| 2004/0020697 A1 | 2/2004 | Field |
| 2006/0231306 A1 * | 10/2006 | Severinsky et al. ......... 180/65.2 |
| 2007/0007056 A1 * | 1/2007 | Bowers et al. ............ 180/65.2 |
| 2008/0156550 A1 * | 7/2008 | Wei et al. ............... 180/65.2 |
| 2009/0171523 A1 * | 7/2009 | Luo et al. ................ 701/22 |
| 2010/0029436 A1 * | 2/2010 | Katsuta et al. ............ 477/5 |
| 2010/0048348 A1 * | 2/2010 | Yang ...................... 477/5 |
| 2010/0152940 A1 * | 6/2010 | Mitsutani et al. ........... 701/22 |
| 2014/0207323 A1 * | 7/2014 | Yoshida et al. ............ 701/22 |
| 2015/0006063 A1 * | 1/2015 | Takahashi et al. .......... 701/110 |

* cited by examiner

SERIES-PARALLEL COUPLING CONTROL METHOD AND SYSTEM OF HYBRID POWER SYSTEM

CROSS-REFERENCE TO RELATED APPLICATIONS

This non-provisional application claims priority under 35 U.S.C. §119(a) on Patent Application No(s). 097146440 filed in Taiwan, R.O.C. on Nov. 28, 2008 the entire contents of which are hereby incorporated by reference.

BACKGROUND OF THE INVENTION

1. Field of Invention

The present invention relates to a method and a system of controlling a series-parallel hybrid power system, in particularly, to a series-parallel coupling control method and system of a hybrid power system.

2. Related Art

A common hybrid power vehicle is to selectively operate under a parallel or series mode, i.e., selectively drive a vehicle to move in a parallel or series output mode. For the parallel output mode, the clutch is in a closed state and the engine and the motor output power in sync to drive the vehicle. For the series mode, the clutch is in an open state and the vehicle is only driven by the motor to move.

Relevant technology regarding hybrid power vehicle (wheel vehicle) can be found in U.S. Pat. No. 6,318,486 entitled "Hybrid Vehicle", issued on Nov. 20, 2001, which discloses a series-parallel hybrid power wheel vehicle. The technology disclosed therein is in that, once the clutch has poor joining (sliding) or becomes too hot, the hybrid power system of the vehicle is actuated to be converted into the series mode (i.e., the clutch is open, and then the motor, instead of the engine, outputs power to drive the vehicle), so as not to deteriorate the driving characteristics of the vehicle due to the problems in the clutch.

U.S. Pat. No. 6,998,727, issued on Feb. 14, 2006, proposes methods of operating a parallel hybrid vehicle having an internal combustion engine and a secondary power source. U.S. Pat. No. 6,876,098, issued on Apr. 5, 2005, discloses methods of operating a series hybrid vehicle.

When switching from the series mode to the parallel mode, or from the parallel mode to the series mode, the current hybrid power vehicle may suffer from sudden thrust (suddenly speed up) or a jerk (suddenly slow down by the power source) because of insufficient switching fluency. Sudden thrust is due to sudden change of the vehicle from one power source to two power sources, and jerk is due to sudden change of the vehicle from two power sources to one power source. Either sudden thrust or jerk will cause pitching movement of the vehicle at the instant of mode switching, thereby greatly reducing comfortability of drivers or passengers.

SUMMARY OF THE INVENTION

In view of the above-mentioned problems, the present invention provides a series-parallel coupling control method and system of a hybrid power system, so as to solve the problem of pitching movement (sudden thrust or jerk) of the vehicle at the instant of mode switching.

The present invention discloses a series to parallel coupling control method of a hybrid power system. The hybrid power system includes a first power source, a second power source, and a power output terminal. The hybrid power system drives a load through the power output terminal. The series to parallel coupling control method performs a series to parallel conversion procedure upon receiving a series to parallel conversion command. The series to parallel conversion procedure includes:

Connecting the second power source to the power output terminal, which is still driven by the first power source, and Increasing an output torque of the second power source, and at the same time, reducing an output torque of the first power source. The rate of increasing the output torque is substantially equal to that of reducing the output torque.

The series to parallel coupling control method further includes the following steps before the step of performing the series to parallel conversion procedure:

Driving the power output terminal by the first power source;

Monitoring a rotation speed of the first power source;

When the rotation speed of the first power source reaches a first predetermined value, actuating the second power source to enhance a rotation speed of the second power source; and When the rotation speed of the second power source is substantially equal to the rotation speed of the first power source, sending the series to parallel conversion command.

Before the step of connecting the second power source to the power output terminal, the series to parallel coupling control method further includes: when the rotation speed of the first power source reaches a first predetermined value, actuating the second power source to enhance a rotation speed of the second power source, till the rotation speed of the second power source is substantially equal to the rotation speed of the first power source.

The present invention further provides a parallel to series coupling control method of a hybrid power system. The hybrid power system includes a first power source, a second power source, a power output terminal, and a generator unit. The hybrid power system drives a load through the power output terminal. The generator unit is driven by the second power source to generate electric power when the second power source is actuated. The parallel to series coupling control method includes:

Driving the power output terminal by the first power source and the second power source at the same time, and When receiving a parallel to series conversion command, performing a parallel to series conversion procedure. The parallel to series conversion procedure includes: increasing an output torque of the first power source and an input torque of the generator unit at the same time, the rate of increasing the output torque being substantially equal to the rate of increasing the input torque; and when the output torque of the first power source is substantially equal to the torque needed by the load (the total torque of the hybrid power vehicle to be driven), cutting off the driving relationship between the second power source and the power output terminal and driving the power output terminal only by the first power source.

After the step of cutting off the driving relationship between the second power source and the power output terminal, the parallel to series coupling control method further includes: reducing an output torque of the second power source when the driving relationship between the second power source and the power output terminal has been cut off.

The parallel to series coupling control method includes reducing the input torque of the generator unit while reducing an output torque of the second power source.

The hybrid power system disclosed by the present invention generates a driving force to drive a load. The hybrid power system includes a first power generation unit, a second power generation unit, and a main controller. The first power generation unit is used to generate a first power, and the second power generation unit is used to generate a second power.

The main controller selectively controls the system to drive the load in a series mode or a parallel mode. In order to control the system to drive the load in the series mode, the main controller controls the first power to drive the vehicle, and in order to control the system to drive the load in the parallel mode, the main controller controls the first power and the second power to drive the load at the same time. When the main controller switches the series mode to the parallel mode, the main controller enhances a rotation speed of the second power generation unit, and when the rotation speed of the second power generation unit is substantially equal to a rotation speed of the first power generation unit, the main controller controls the first power generation unit and the second power generation unit to drive the load at the same time.

The hybrid power system further includes a generator unit, which undergoes the second power to generate an electric power. When the main controller switches the parallel mode to the series mode, the main controller increases the first power (of the first power generation unit) and an input torque of the generator unit, and when the first power is substantially equal to the load, the main controller only controls the first power to drive the load.

The hybrid power system further includes an electric power storage device, for storing the electric power generated by the generator unit, and outputting the electric power to the first power generation unit to generate the first power.

The hybrid power system further includes a clutch, which is controlled by the main controller to selectively output or not output the second power to the load.

The hybrid power system further includes a power transmission device, for converting the first power and the second power to drive the load.

The first power generation unit (the first power source) is an electric motor. The second power generation unit (the second power source) is an engine (or an internal combustion engine). The generator unit is a cell. The power transmission device is a transmission. The load may be, but is not limited to, vehicle, wheel vehicle, and delivery vehicle, etc.

The hybrid power system, the parallel to series coupling control method of the hybrid power system, and the series to parallel coupling control method of the hybrid power system according to the present invention are used to drive a load. In the series to parallel output mode, through appropriate adjustment of the rotation speed and the torque (simply as "rotation speed compensation"), a single power source (first power source or called first power generation unit) for outputting to drive the load can be smoothly switched into two power sources (first and second power sources or called first and second power generation units) for outputting at the same time to drive the load. In this way, the problem of sudden thrust can be avoided. In the parallel to series output mode, the torque is increased or decreased appropriately and then the parallel to series conversion is performed (simply as "torque compensation or power compensation"). In this way, the problem of jerk can be avoided.

The features, practice, and effect of the present invention will be described in detail below in the embodiments with the accompanying drawings.

The above description of the content of the present invention and the following description of the embodiments are intended to demonstrate and explain the spirit and principle of the present invention and to provide further explanation of the claims of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The detailed features and advantages of the present invention will be described in detail in the following embodiments, whereby those skilled in the art can easily understand and implement the content of the present invention. Furthermore, the relevant objectives and advantages of the present invention are apparent to those skilled in the art with reference to the contents disclosed in the specification, claims, and drawings.

Figure 1:
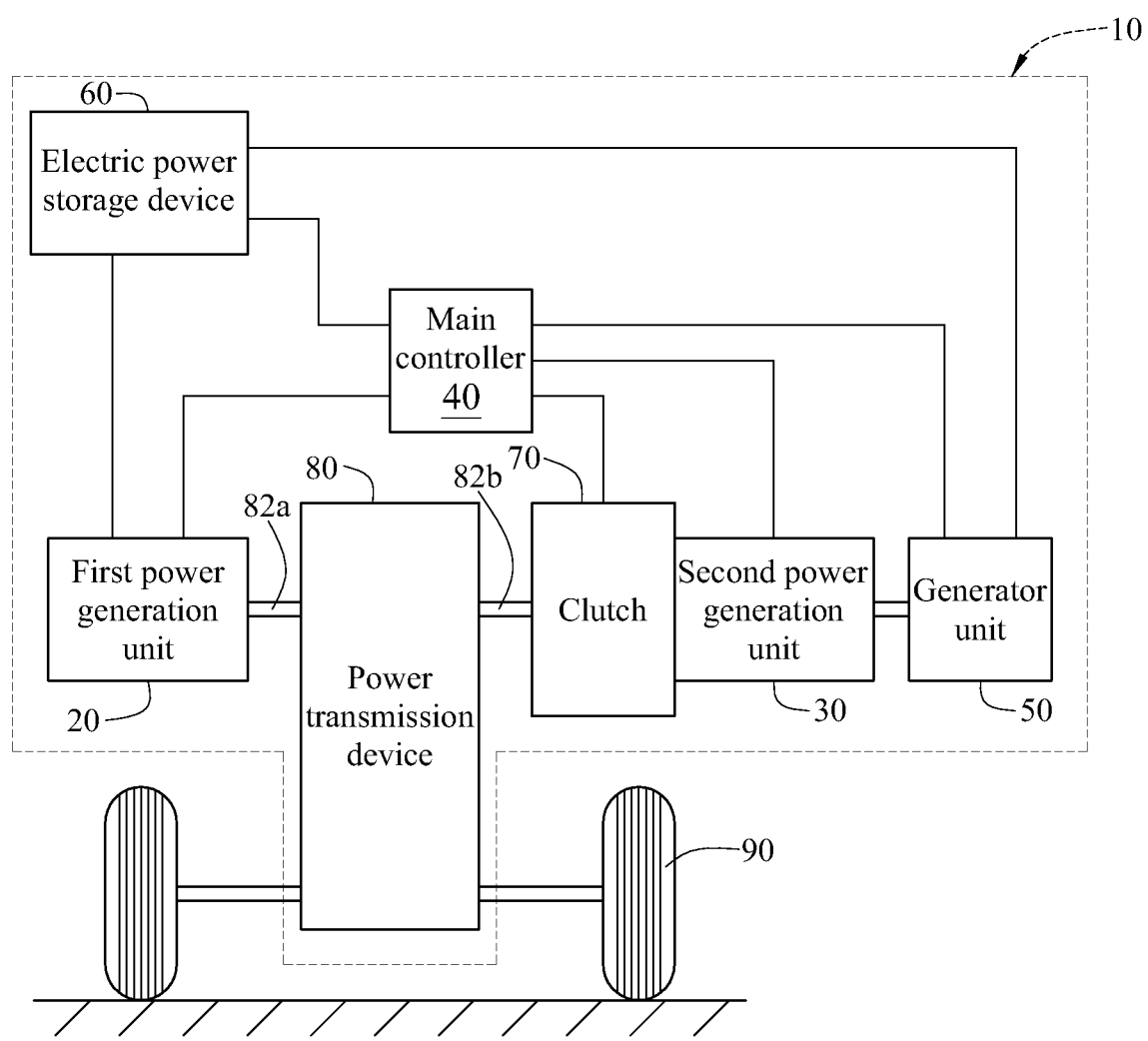
FIG. 1 is a schematic structural view of the hybrid power system according to an embodiment of the present invention.

Referring to FIG. 1, a hybrid power system according to an embodiment of the present invention is shown, which generates a driving force to drive a load 90. The hybrid power system 10 includes a first power generation unit 20, a second power generation unit 30, and a main controller (Main Control Unit or Vehicle Control Unit) 40.

The first power generation unit 20 is used to generate a first power, and the second power generation unit 30 is used to generate a second power.

The main controller 40 selectively controls the system 10 to drive the load 90 in a series mode or a parallel mode. In order to control the system 10 to drive the load in the series mode, the main controller 40 controls the first power to drive the load 90, and in order to control the system 10 to drive the load 90 in the parallel mode, the main controller 40 controls the first power and the second power to drive the load 90 at the same time. When the main controller 40 switches the series mode to the parallel mode, the main controller 40 enhances a rotation speed of the second power generation unit 30, and when the rotation speed of the second power generation unit 30 is substantially equal to a rotation speed of the first power generation unit 20, the main controller 40 controls the first power generation unit 20 and the second power generation unit 30 to drive the vehicle at the same time.

The load 90 driven by the hybrid power system may be, but is not limited to, vehicle, wheel vehicle, or any delivery vehicle. The present invention is illustrated with a vehicle as an example below, but the application of the present invention is not limited thereto. The driving force generated by the hybrid power system may be, but is not limited to, a rotary power. The rotary power acts on the tires of the load (vehicle) 90 through a power transmission device 80, thereby driving the vehicle to move. In addition to power transmission, the power transmission device 80 may have speed changing effect, such as, as a transmission or an automatic transmission commonly used in vehicles.

The first power generation unit 20 can also be called a first power source. Taken a vehicle as an example, the first power generation unit 20 may be, but is not limited to, an electric motor. The motor, after receiving the electric power of a cell (also called an electric power storage device) 60, generates a rotary power, i.e., the first power. The first power generation unit 20 also includes a motor control unit, which is controlled by the main controller 40 to drive the motor to generate the rotary power. The main controller 40 can control the rotation speed and the output torque of the first power generated by the first power generation unit 20.

The second power generation unit 30 can also be called a second power source. Taken a vehicle as an example, the second power generation unit 30 may be, but is not limited to, an engine or an internal combustion engine. That is, the second power is generated by an energy source other than electric power. The energy source other than electric power can be gasoline, diesel oil, or bio-alcohol. The second power may be a rotary power. The second power generation unit 30 may also have an engine control unit. The engine control unit is controlled by the main controller 40 to drive the second power generation unit 30 to generate the second power, thereby controlling the rotation speed and output torque of the second power (the second power generation unit 30).

The transmission also has a transmission control unit (TCU), which is also controlled by the main controller 40 to appropriately convert the received power and output it to the load.

The series mode refers to only outputting the first power generated by the first power generation unit 20 to the load 90, and not outputting (not connecting) the second power generated by the second power generation unit 30 to the load 90. At this point, the torque of the first power is equal to the torque needed by the load. That is to say, the hybrid power system 10 drives the first power generation unit 20 by the electric power of the cell 60, and the first power of the first power generation unit 20 drives the load (vehicle) 90. The second power generation unit 30 can be in a non-operation mode. At this time, if the second power generation unit 30 is still in an operation state, it is for other purposes, for example, driving a generator unit 50 to generate electric power, which is further stored in an electric power storage device 60. The function will be illustrated later.

The parallel mode refers to outputting the first power generated by the first power generation unit 20 and the second power generated by the second power generation unit 30 at the same time, and driving the load 90. Referring to FIG. 1 again, it can be seen that the second power generation unit 30 can be connected to the power transmission device 80 through a clutch 70. The clutch 70 is controlled by the main controller 40 to selectively output or not output the second power to the load 90. That is to say, the main controller 40 controls the closed or open state of the clutch 70, so as to selectively output the second power of the second power generation unit 30 to the load 90. When the system 10 is in the parallel mode, the main controller 40 controls the clutch 70 to be closed. At this time, the second power is transmitted to the power transmission device 80 through the clutch 70, thereby driving the load 90. When the system 10 is in the series mode, the main controller 40 controls the clutch 70 to be open. At this time, the second power cannot be transmitted to the power transmission device 80 through the clutch 70. Only the first power of the first power generation unit 20 drives the load 90.

The clutch 70 may be, but is not limited to, an electrical clutch. Taken a vehicle as an example, the transmission of the control signals between the main controller 40 and the transmission control unit or the electrical clutch is in the form of a CAN (Controller Area Network) bus, which is a technology similar to network packet transmission messages, transmits or receives messages in a one-to-many manner, and has the advantages of rapid transmission and reduced volume of wiring materials.

According to the hybrid power system in an embodiment of the present invention, when the main controller 40 switches the series mode to the parallel mode, or switches the parallel mode to the series mode, the whole system 10 is controlled, so as to achieve the purpose of solving the problems of sudden thrust and jerk.

Before describing the control actions of the main controller 40 to switch the series mode (also called series coupling mode) to the parallel mode (also called parallel coupling mode), when to use the series mode or parallel mode will be first illustrated herein.

The system 10 includes a first power generation unit 20 and a second power generation unit 30. One of the power generation units 20 and 30 must be economic in low speed operation, and the other must be economic in high speed operation. The "economic" herein can refer to rotary power or rotary torque generated per unit energy or per unit cost, but is not limited thereto. If the first and second power generation units 20 and 30 are a motor and an engine respectively, for example, the motor is more economic than the engine in low speed operation and the engine is more economic than the motor in high speed operation. Therefore, the hybrid power system 10 adopts the respective advantages of the first power generation unit 20 and the second power generation unit 30. That is, the hybrid power system 10 adopts the first power generation unit 20 (motor) as a power source for driving the load in low speed operation, which is the aforementioned series mode. The hybrid power system 10 adopts the first power generation unit 20 and the second power generation unit 30 to drive the load at the same time in high speed operation, which is the aforementioned parallel mode. In the parallel mode, the main controller 40 can also make the first power generation unit 20 be in a following state, not in an actuating state. In this manner, the whole hybrid power system 10 can drive the load in a most economic mode.

The time of switching the series mode into the parallel mode depends on the demand of the load driven by the hybrid power system 10 and the properties of the hybrid power system 10. Generally, where the second power generation unit 30 is connected to the power transmission device 80 as the clutch 70 is closed, the second power generation unit 30 and the first power generation unit 20 are in coaxial rotation. Therefore, when the series mode is switched to the parallel mode, before the clutch 70 is closed, the rotation speed of the second power generation unit 30 is substantially equal to the rotation speed of the first power generation unit 20. The "substantially equal to" herein refers to that the difference between the rotation speeds of the power generation units 20 and 30 falls in a specific value range, for example, the difference between the rotation speeds is within 5% or 100 rpm (100 rotations per minute).

Factors for determining appropriate switching rotation speed of the series to parallel (S2P) conversion of the first and second power generation units 20 and 30 include the properties and performance of the first and second power generation units 20 and 30, and the properties of the load, etc. The appropriate switching rotation speed can also be obtained from experiments. In order to illustrate the present invention conveniently, for example, the switching rotation speed of the series to parallel (S2P) conversion is determined to be 2000 rpm and the rotation speed difference is determined to be 100 rpm.

Figure 2A:
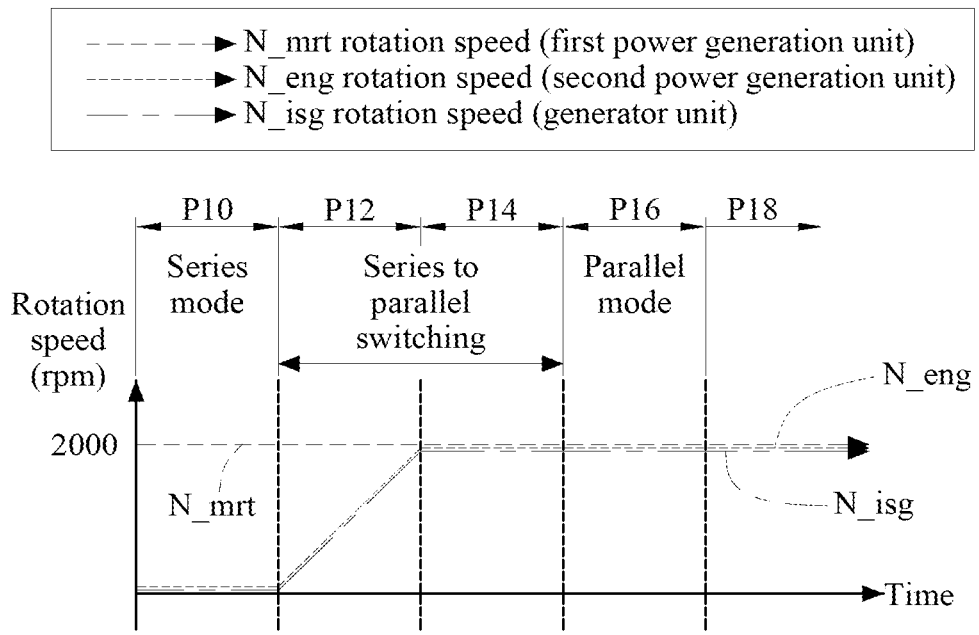
FIG. 2A is a schematic rotation speed-time profile of the series to parallel power coupling process of the hybrid power system according to an embodiment of the present invention.
Figure 2B:
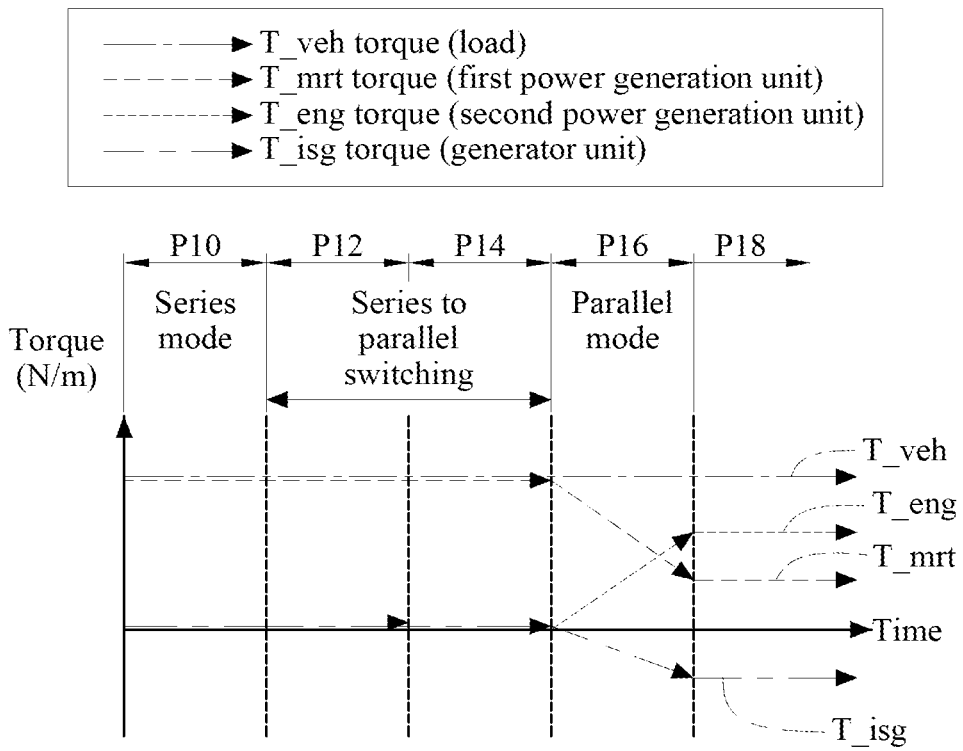
FIG. 2B is a schematic torque-time profile of the series to parallel power coupling process of the hybrid power system according to an embodiment of the present invention.

Please refer to FIG. 2A and FIG. 2B at the same time. FIG. 2A is a schematic rotation speed-time profile of the series to parallel power coupling process of the hybrid power system according to an embodiment of the present invention, and FIG. 2B is a schematic torque-time profile of the series to parallel power coupling process of the hybrid power system according to an embodiment of the present invention. After the system 10 is started, it operates in the series mode (the speed starts from zero), i.e., the load 90 is driven by the first power generation unit 20. That is, the time interval P10 in the figures. At this time, the main controller 40 monitors the rotation speed (N_mtr) of the first power generation unit 20. When the rotation speed of the first power generation unit 20 is enhanced to reach a predetermined rotation speed, for example, 2000 rpm (the time interval P10 in the figures) in the figures, the main controller 40 sends a series to parallel conversion command (S2P Command), and performs a series to parallel conversion procedure (S2P procedure). Referring to FIG. 2B, in the time interval P10, only the first power generation unit 20 drives the load 90. Therefore, the total torque (T_veh) needed by the load 90 and the output torque (T_mtr) of the first power generation unit 20 are substantially the same (the two parallel lines which are extremely close to each other depicted in the figures are for recognition, in fact, the two parallel lines overlap). The rotation speed (N_eng) and the output torque (T_eng) of the second power generation unit 30 are still zero. Since the generator unit 50 and the second power generation unit 30 joint coaxially, the generator unit 50 does not operate (N_isg=0), either, and the consumed input torque (T_isg) is also zero.

Upon receiving a series to parallel conversion command, the main controller 40 enhances the rotation speed of the second power generation unit 30, such as the time interval P12 in FIG. 2A and FIG. 2B. At this time, although the rotation speed (N_eng) of the second power generation unit 30 is enhanced, the output torque (T_eng) is still zero.

When the rotation speed of the second power generation unit 30 is substantially equal to the rotation speed of the first power generation unit 20 (i.e., the time interval P14 in the figures), the main controller 40 connects the second power generation unit 30 to the load 90. That is, the main controller 40 closes the clutch 70 (the main controller 40 sends a command to control the clutch 70), so as to connect the second power generation unit 30 to the power transmission device 80. During the time interval P14, the second power generation unit 30 still has no output torque (T_eng=0), and the load 90 is still driven by the first power generation unit 20. In this manner, sudden thrust will not occur. The time interval P14 usually starts when the main controller 40 sends a closing command, and ends when the clutch 70 returns a signal that the closing has been finished.

After the clutch 70 returns a signal that the closing has been finished, the time interval P16 starts. At this time, the main controller 40 controls the first power generation unit 20 and the second power generation unit 30 to drive the load 90 at the same time. That is, the time interval P16 begins, i.e., the load is driven in a parallel mode. In order to make the performance of the whole system be better, the main controller 40 will (gradually) reduce the output torque of the first power generation unit 20, and (gradually) enhance the output torque of the second power generation unit 30. At this time, the generator unit 50 is driven by the output torque of the second power generation unit 30 to generate an electric power. The electric power is stored in the electric power storage device 60. The rate of increasing the output torque of the second power generation unit 30 may be substantially equal to the rate of reducing the output torque of the first power generation unit 20. The method of increasing or reducing the output torque with the same rate can efficiently avoid the occurrence of sudden thrust or jerk.

The main controller 40 reduces the output torque of the first power generation unit 20 by directly controlling the driving unit (i.e., the motor control unit) of the first power generation unit 20, so as to appropriately reduce a current supplied to the first power generation unit 20, but not adjust the frequency supplied to the first power generation unit 20, so that the output torque of the first power generation unit 20 can be reduced.

The main controller 40 can control the output torque of the second power generation unit 30, but not enhance the rotation speed of the second power generation unit 30 with, but not limited to, the following two methods. One method is to control the generator unit 50 to generate electricity by using the second power generated by the second power generation unit 30. As such, one part of the second power is used to generate electricity, and the other part is supplied to the load 90, thereby achieving the controlling purpose. The second method is that the main controller 40 controls the torsion of the first power generation unit 20, so as to reduce the first power, without changing the total output power (i.e., the power driving the load 90 is unchanged), thereby also changing the output torque of the second power generation unit 30 without changing the rotation speed.

The time interval P18 continues the parallel mode of the interval P16. The output torque of the first power generation unit 20, the output torque of the second power generation unit 30, and the input torque of the generator unit 50 can be properly adjusted based on the demand of the load 90. However, the rotation speeds of the three will become identical due to the closed state of the clutch 70 (note: the three lines in the figures do not overlap, which is only for easy recognition, and does not mean that the rotation speeds are different). In the time interval P18, if the rotation speed and the torque demanded by the load 90 are not high, but the output torque of the second power generation unit 30 is large, the main controller 40 increases the input torque of the generator unit 50, thereby generating more electric power to be stored in the electric power storage device 60.

When the generator unit 50 is applied in a vehicle, it may be, but is not limited to, an integrated starter generator. The integrated starter generator can be controlled by the main controller 40 to selectively serve as a starter or a generator. When the integrated starter generator serves as a starter, the electric power storage device 60 provides an electric power and generates a rotary power, so as to drive the second power generation unit 30 to actuate. Referring to FIG. 2A and FIG. 2B again, before the time interval P12 in the figures, the rotation speed of the second power generation unit 30 is zero. After the second power generation unit 30 is driven by the starter, the fuel (such as gasoline or diesel oil) of the second power generation unit 30 is converted into the second power.

After the second power generation unit 30 is started, the main controller 40 controls the integrated starter generator to be converted into a generator. The integrated starter generator receives the second power transmitted from the second power generation unit 30 to generate electric power. The generator unit 50 also has a generator control unit controlled by the main controller 40. The generator control unit receives a command from the main controller 40 to control the operation state (starter or generator) and input torque of the generator unit 50.

Figure 3A:
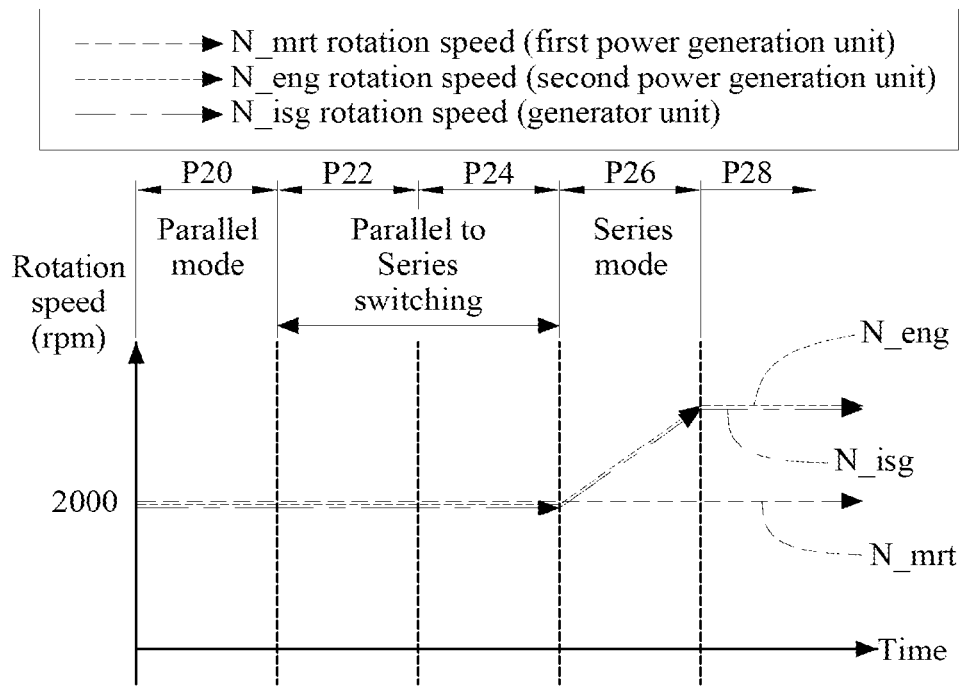
FIG. 3A is a schematic rotation speed-time profile of the parallel to series power coupling process of the hybrid power system according to an embodiment of the present invention.
Figure 3B:
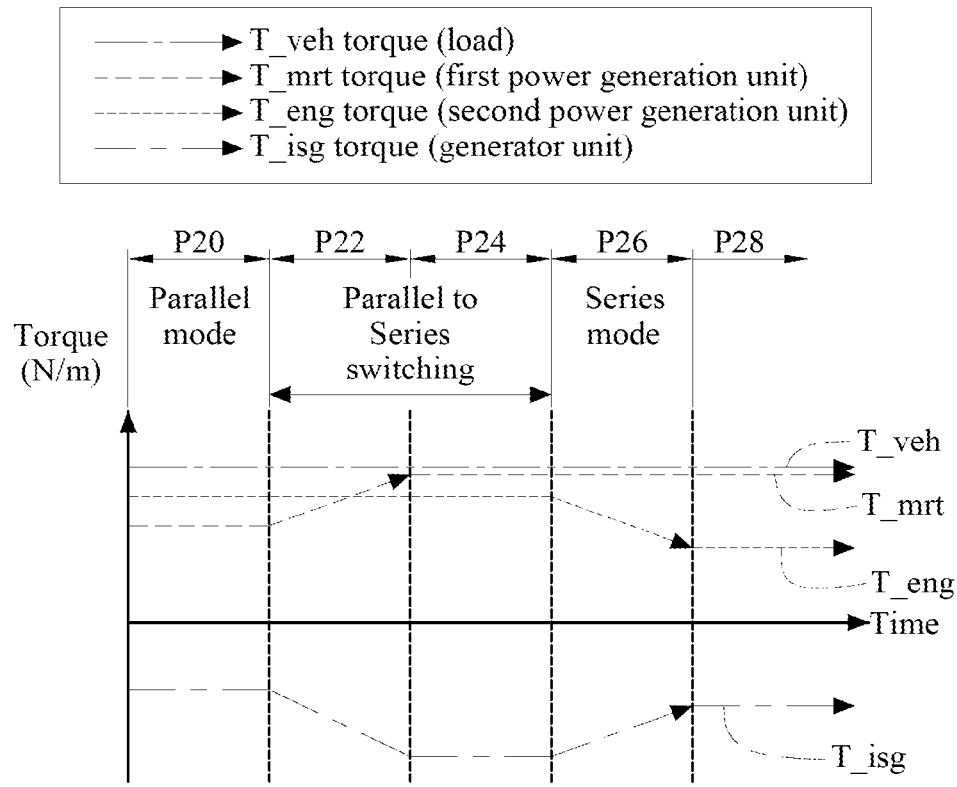
FIG. 3B is a schematic torque-time profile of the parallel to series power coupling process of the hybrid power system according to an embodiment of the present invention.

Next, please refer to FIG. 3A and FIG. 3B at the same time. FIG. 3A is a schematic rotation speed-time profile of the parallel to series power coupling process of the hybrid power system according to an embodiment of the present invention; and FIG. 3B is a schematic torque-time profile of the parallel to series power coupling process of the hybrid power system according to an embodiment of the present invention.

It can be seen from the figures that, in the time interval P20, the rotation speeds of the first power generation unit 20, the second power generation unit 30, and the generator unit 50 are substantially the same. The output torques of the first power generation unit 20 and the second power generation unit 30 and the input torque of the generator unit 50 depend on the main controller 40, and the load 90, and the demand of the generated electricity. The time interval P20 is similar to the time interval P18. Both are in the parallel mode (also called parallel power coupling mode).

When the load 90 needs to continuously reduce the rotation speed, the main controller 40 sends a parallel to series conversion command and performs a parallel to series conversion procedure, entering the time interval P22. In the time interval P22, the main controller 40 controls and increases the output torque of the first power generation unit 20. At this time, since the total torque needed by the load 90 and the output torque of the second power generation unit 30 are unchanged, the increased amount for the output torque of the first power generation unit 20 is supplied to the generator unit 50. Therefore, the input torque of the generator unit 50 is also increased by the main controller 40. The rate of increasing the input torque of the generator unit 50 is substantially the same as the rate of increasing the output torque of the first power generation unit 20. As such, the load 90 will not suffer from jerk or sudden thrust. The output torque (T_mtr) of the first power generation unit 20, the output torque (T_eng) of the second power generation unit 30, the input torque (T_isg) of the generator unit 50, and the total torque (T_veh) needed by the load 90 can be represented in the relational expression: $T\_veh = T\_eng + T\_mtr - T\_isg$.

At the end of the time interval P22, the output torque of the first power generation unit 20 is substantially equal to the total torque needed by the load 90. At this time, the main controller 40 will send a comment of opening the clutch 70 and enters the time interval P24. In the time interval P24, the main controller 40 waits for a signal indicating that the opening has been finished from the clutch 70. The main controller 40, after receiving the signal indicating that the opening has been finished, enters the time interval P26, i.e., the parallel coupling mode. In this time interval, in order to operate the whole system 10 in a more economic way, the main controller 40 will reduce the output torque of the second power generation unit 30. Since the output torque of the second power generation unit 30 is directly supplied to the generator unit 50 to generate electricity, the input torque of the generator unit 50 will be increased with a reduced extent of the output torque of the second power generation unit 30, so as to apply the output torque of the second power generation unit 30 efficiently. In the time interval P26, in order to make use of the output torque of the second power generation unit 30 in a more economic way, the main controller 40 often enhances its rotation speed. As stated above, the more economic rotation speed of the second power generation unit 30 depends on the properties of the second power generation unit 30. The rotation speeds of the second power generation unit 30 and the generator unit 50 are identical (the two separate lines in the figures are only for easy recognition, but do not mean that the rotation speeds are different).

In the time interval P28, the first power generation unit 20 provides the first power to the load 90 alone. The rotation speeds and the torques of the second power generation unit 30 and the generator unit 50 are in economic state. The rotation speed of the first power generation unit 20 may be reduced due to the demand of the load 90, and the output torque of the first power generation unit 20 may also be increased due to the demand of the load 90, depending on the demand of the load. The main controller 40 will adjust them according to the demand of the load 90. If the rotation speed demanded by the load 90 is higher than the predetermined value (for example, 2000 rpm) again, the main controller 40 will perform the series to parallel conversion procedure.

Figure 4:
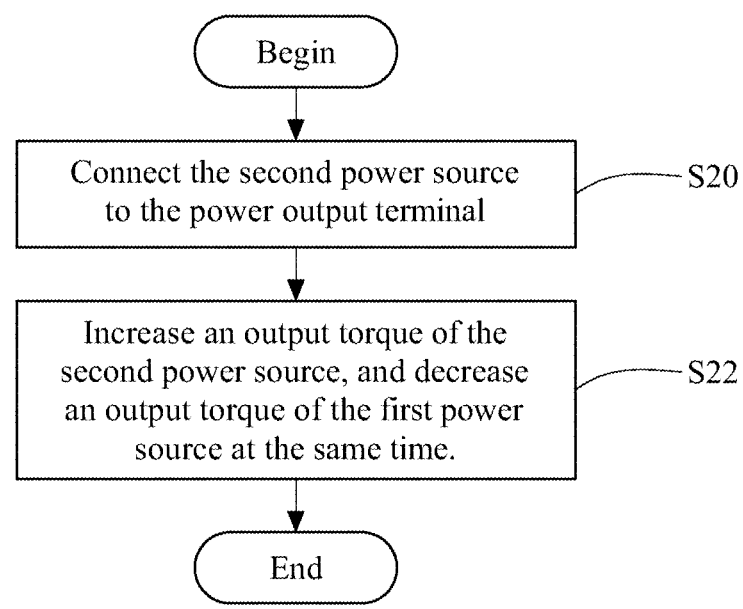
FIG. 4 is a flow chart of the series to parallel conversion procedure of the hybrid power system according to an embodiment of the present invention.

Refer to FIG. 4 regarding the series to parallel coupling control method of the hybrid power system of the present invention. The hybrid power system 10 includes a first power source 20, a second power source 30, and a power output terminal 82a, 82b (See FIG. 1). The hybrid power system 10 drives a load 90 through the power output terminal 82a, 82b. The series to parallel coupling control method, upon receiving a series to parallel conversion command, performs a series to parallel conversion procedure. The series to parallel conversion procedure includes:

Step S20: connect (or attach) the second power source 30 to the power output terminal 82a, 82b, and still drive the power output terminal 82a, 82b with the first power source 20; and Step S22: increase an output torque of the second power source 30, and decrease an output torque of the first power source 20 at the same time, the rate of increasing the output torque being substantially equal to the rate of decreasing the output torque.

The first power source 20 may be the first power generation unit 20, electric motor. Likewise, the second power source 30 may be the second power generation unit 30, engine, or internal combustion engine. The power output terminal 82a, 82b is an axial rod connected to the power transmission device 80.

The connecting of the second power source 30 to the power output terminal 82a, 82b is such that the main controller 40 controls the clutch 70 to be closed, so as to perform Step S20. After Step S20 is finished (i.e., the clutch 70 sends a signal that the closing has been finished), perform Step S22.

The increasing of the output torque of the second power source 30 in Step S22 can be gradually done, so as to reduce the impact brought by the instantaneously increased torque. Likewise, with a rate of enhancing the output torque, gradually decrease the output torque of the first power source 20.

Figure 5:
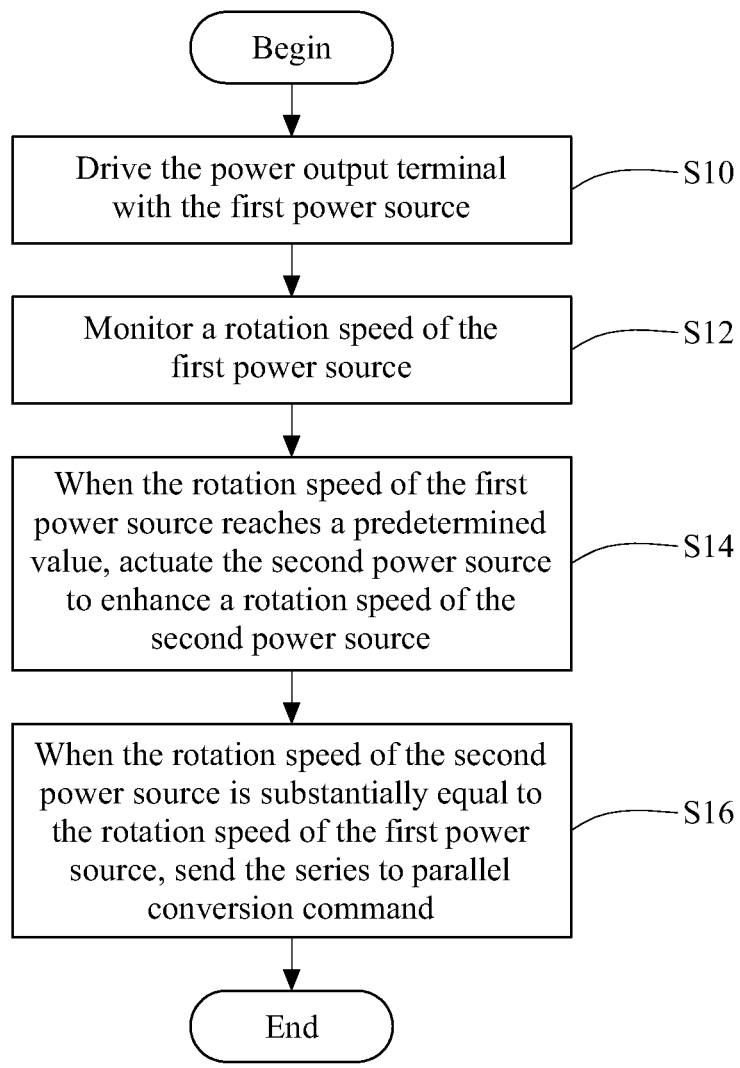
FIG. 5 is a flow chart of the pre-procedure of the series to parallel conversion procedure of the hybrid power system according to an embodiment of the present invention.

Before performing the series to parallel conversion procedure, a pre-procedure is further performed, which includes (See FIG. 5):

Step S10: drive the power output terminal 82a, 82b with the first power source 20;

Step S12: monitor a rotation speed of the first power source 20;

Step S14: when the rotation speed of the first power source 20 reaches a predetermined value, actuate the second power source 30 to enhance a rotation speed of the second power source 30; and Step S16: when the rotation speed of the second power source 30 is substantially equal to the rotation speed of the first power source 20, send the series to parallel conversion command.

Before Step S20, perform Step S18 (not shown for only a single step): enhance a rotation speed of the second power source 30, till the rotation speed of the second power source 30 is substantially equal to a rotation speed of the first power source 20.

The series to parallel conversion command is sent based on the following conditions: when the rotation speed of the first power source 20 reaches a predetermined value (for example, 2000 rpm), the main controller 40 sends the series to parallel conversion command.

Figure 6:
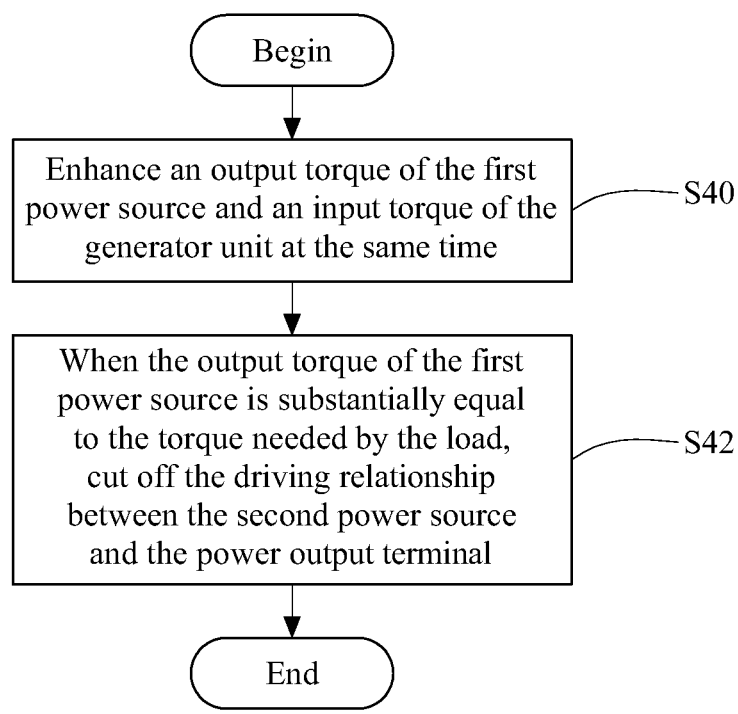
FIG. 6 is a flow chart of the parallel to series conversion procedure of the hybrid power system according to an embodiment of the present invention.

Refer to FIG. 6 regarding the parallel to series coupling control method of the hybrid power system 10 of the present invention. The hybrid power system 10 includes a first power source (device) 20, a second power source (device) 30, a power output terminal 82a, 82b, and a generator unit 50. The hybrid power system 10 drives a load 90 through the power output terminal 82a, 82b. When the second power source 30 is actuated, the generator unit 50 is driven by the second power source 30 to generate electric power. The parallel to series coupling control method, upon receiving a parallel to series conversion command, performs a parallel to series conversion procedure. The parallel to series conversion procedure includes:

Step S40: enhance an output torque of the first power source 20 and an input torque of the generator unit 50 at the same time, the rate of increasing the output torque being substantially equal to the rate of increasing the input torque; and Step S42: when the output torque of the first power source 20 is substantially equal to the torque needed by the load 90 (i.e., the total torque needed by the load 90), cut off the driving relationship between the second power source 30 and the power output terminal 82a, 82b and drive the power output terminal 82a, 82b only with the first power source 20.

In Step S40, when the output torque of the first power source 20 and the input torque of the generator unit 50 are enhanced, the electricity generation of the generator unit 50 will be increased, and the generated electric power is stored in the electric power storage device 60.

In Step S42, the cutting off of the driving relationship between the second power source 30 and the power output terminal 82a, 82b means that the main controller 40 controls the clutch 70 to separate the connection (transmission) relationship between the second power generation unit 30 and the power transmission device 80.

The time of sending the parallel to series conversion command is when the system 10 is operated under a parallel mode and the first power source 20 and the second power source 30 drive the power output terminal 82a, 82b at the same time. At this time, if the rotation speed needed by the load 90 is reduced to a rotation speed at which the second power source 30 is less economic and the first power source 20 is more economic, the main controller 40 sends the parallel to series conversion command.

The rotation speed triggering the parallel to series conversion command depends on the properties of the first power source 20, the second power source 30, the load 90, and the generator unit 50, which not only can be calculated theoretically, but also can be obtained with real-machine test. Even if the rotation speed is obtained through experiments, in practical operation, it is often increased or decreased by a specific value (100 rpm or 5%), so that it forms an interval, and then is introduced in the aforementioned procedure.

When Step S42 is finished (i.e., the clutch 70 returns a signal that the opening has been finished), Step S44 (not shown for only a single step) can also be performed: decrease an output torque of the second power source 30. In this manner, the input torque of the generator unit is also reduced in sync. However, since the second power source 30 does not drive the load 90, the rotation speed thereof is increased thereby, so that the second power source 30 operates in a more economic rotation speed.

According to the series-parallel coupling control method and system of the hybrid power system of the present invention, during the series to parallel coupling control or the parallel to series coupling control, the rotation speed compensation and the torque (power) compensation are employed respectively, thereby avoiding the occurrence of sudden thrust or jerk.

What is claimed is:

1. A series to parallel coupling control method of a hybrid power system, the hybrid power system comprises a first power source, a second power source, and a power output terminal, and drives a load through the power output terminal, the series to parallel coupling control method comprises:
   upon receiving a series to parallel conversion command, performing a series to parallel conversion procedure, which comprises:
   connecting the second power source to the power output terminal, wherein the power output terminal is still driven by the first power source; and
   increasing an output torque of the second power source, and reducing an output torque of the first power source at the same time, the rate of increasing the output torque being substantially equal to the rate of reducing the output torque.

2. The series to parallel coupling control method according to claim 1, wherein before performing the series to parallel conversion procedure, further comprising:
   driving the power output terminal with the first power source;
   monitoring a rotation speed of the first power source;
   when the rotation speed of the first power source reaches a predetermined value, actuating the second power source to enhance a rotation speed of the second power source; and
   when the rotation speed of the second power source is substantially equal to the rotation speed of the first power source, sending the series to parallel conversion command.

3. The series to parallel coupling control method according to claim 1, wherein before the step of connecting the second power source to the power output terminal, further comprising:
   enhancing a rotation speed of the second power source, till the rotation speed of the second power source is substantially equal to a rotation speed of the first power source.

4. The series to parallel coupling control method according to claim 1, wherein the first power source is an electric motor and the second power source is an engine.

5. A parallel to series coupling control method of a hybrid power system, the hybrid power system comprises a first power source, a second power source, a power output terminal, and a generator unit, and drives a load through the power output terminal, wherein the generator unit is driven by the second power source to generate an electric power when the second power source is actuated, the parallel to series coupling control method comprises:

driving the power output terminal with the first power source and the second power source at the same time; and upon receiving a parallel to series conversion command, performing a parallel to series conversion procedure, which comprises:

increasing an output torque of the first power source and an input torque of the generator unit at the same time, the rate of increasing the output torque being substantially equal to the rate of increasing the input torque; and when the output torque of the first power source is substantially equal to the total torque needed by the load, cutting off the driving relationship between the second power source and the power output terminal and driving the power output terminal with the first power source.

6. The parallel to series coupling control method according to claim 5, wherein after cutting off the driving relationship between the second power source and the power output terminal, further comprising:

when the driving relationship between the second power source and the power output terminal has been cut off, reducing an output torque of the second power source.

7. The parallel to series coupling control method according to claim 6, wherein while reducing an output torque of the second power source, the input torque of the generator unit is reduced.

8. The parallel to series coupling control method according to claim 5, wherein after the step of cutting off the driving relationship between the second power source and the power output terminal, further comprising:

when the driving relationship between the second power source and the power output terminal has been cut off, enhancing a rotation speed of the second power source.

9. The parallel to series coupling control method according to claim 5, wherein the first power source is an electric motor, the second power source is an engine, and the generator unit is an integrated starter generator.

10. A hybrid power system, generating a driving force to drive a load, the hybrid power system comprises:

a first power generation unit, for generating a first power;

a second power generation unit, for generating a second power; and a main controller, for selectively controlling the system to drive the load in a series mode or a parallel mode, wherein in order to control the system to drive the load in the series mode, the main controller controls the first power to drive the load, and in order to control the system to drive the load in the parallel mode, the main controller controls the first power and the second power to drive the load at the same time; when the main controller switches the series mode to the parallel mode, the main controller enhances a rotation speed of the second power generation unit, and when the rotation speed of the second power generation unit is substantially equal to a rotation speed of the first power generation unit, the main controller controls the first power generation unit and the second power generation unit to drive the load at the same time.

11. The hybrid power system according to claim 10, further comprising a generator unit, which undergoes the second power to generate an electric power, wherein when the main controller switches the parallel mode to the series mode, the main controller increases the first power and an input torque of the generator unit, and when the first power is substantially equal to the load, the main controller only controls the first power to drive the load.

12. The hybrid power system according to claim 11, further comprising an electric power storage device, for storing the electric power generated by the generator unit, and outputting the electric power to the first power generation unit to generate the first power.

13. The hybrid power system according to claim 11, further comprising a clutch, which is controlled by the main controller to selectively output or not output the second power to the load.

14. The hybrid power system according to claim 11, further comprising a power transmission device, for converting the first power and the second power to drive the load.

15. The hybrid power system according to claim 14, wherein the first power generation unit is an electric motor, the second power generation unit is an engine, the generator unit is an integrated starter generator, and the power transmission device is a transmission.

\* \* \* \* \*